(12) United States Patent
Takahashi et al.

(10) Patent No.: US 10,027,189 B2
(45) Date of Patent: Jul. 17, 2018

(54) ELECTRIC ROTATING MACHINE

(71) Applicant: KABUSHIKI KAISHA TOSHIBA, Tokyo (JP)

(72) Inventors: Hiroshi Takahashi, Kanagawa (JP); Takahiro Kokubo, Kanagawa (JP); Yasuhito Ueda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 307 days.

(21) Appl. No.: 14/725,700

(22) Filed: May 29, 2015

(65) Prior Publication Data
US 2015/0349589 A1 Dec. 3, 2015

(30) Foreign Application Priority Data

May 30, 2014 (JP) ................. 2014-113031

(51) Int. Cl.
*H02K 1/12* (2006.01)
*H02K 1/14* (2006.01)
*H02K 1/18* (2006.01)

(52) U.S. Cl.
CPC ............. *H02K 1/145* (2013.01); *H02K 1/185* (2013.01); *Y02E 10/725* (2013.01)

(58) Field of Classification Search
CPC ............................ H02K 1/185; Y02E 10/725
USPC ......................................... 310/418, 419, 257
See application file for complete search history.

(56) References Cited

U.S. PATENT DOCUMENTS

| 5,382,860 A | 1/1995 | Fanning et al. | |
| 6,229,238 B1 * | 5/2001 | Graef | H02K 1/185 310/156.02 |
| 6,236,131 B1 * | 5/2001 | Schafer | H02K 3/24 310/156.02 |
| 7,994,691 B2 * | 8/2011 | George | H02K 1/185 310/419 |
| 8,860,287 B2 * | 10/2014 | Longtin | H02K 1/146 310/418 |
| 9,236,773 B2 * | 1/2016 | Janecek | H02K 15/02 |
| 2002/0074884 A1 * | 6/2002 | Fuller | H02K 1/185 310/91 |
| 2002/0113518 A1 * | 8/2002 | Hsu | H02K 1/148 310/418 |

(Continued)

FOREIGN PATENT DOCUMENTS

CN 100541988 C 9/2009
CN 101971468 A 2/2011

(Continued)

*Primary Examiner* — Forrest M Phillips
(74) *Attorney, Agent, or Firm* — Finnegan, Henderson, Farabow, Garrett & Dunner, L.L.P.

(57) ABSTRACT

According to an embodiment, an electric rotating machine includes a rotor element, an annular coil, a plurality of stator cores, and a plurality of wedge members. The rotor element is rotatable around a rotation axis. The coil is provided to be coaxial with the rotation axis. The plurality of stator cores are provided opposite to the rotor element and each includes a pair of magnetic pole parts opposing each other with the coil being interposed therebetween. Each of the plurality of wedge members is arranged between adjacent stator cores to apply preloads to the adjacent stator cores, the preloads containing components in a rotation direction of the rotor element and being opposite to each other.

11 Claims, 17 Drawing Sheets

(56) References Cited

U.S. PATENT DOCUMENTS

| | | | |
|---|---|---|---|
| 2002/0113520 A1* | 8/2002 | Kastinger | H02K 21/145 310/254.1 |
| 2004/0046478 A1 | 3/2004 | Zierer et al. | |
| 2004/0075357 A1 | 4/2004 | Kastinger et al. | |
| 2005/0062352 A1 | 3/2005 | Kastinger | |
| 2005/0212381 A1 | 9/2005 | Gilmour et al. | |
| 2006/0091737 A1 | 5/2006 | Lee et al. | |
| 2010/0310393 A1 | 12/2010 | Lee et al. | |
| 2012/0249035 A1 | 10/2012 | Ueda | |
| 2013/0038158 A1 | 2/2013 | Takahashi | |
| 2014/0117793 A1* | 5/2014 | Takahashi | H02K 21/145 310/52 |
| 2015/0015126 A1 | 1/2015 | Ueda | |
| 2015/0084465 A1 | 3/2015 | Takahashi et al. | |
| 2015/0091403 A1* | 4/2015 | Ueda | H02K 21/145 310/114 |

FOREIGN PATENT DOCUMENTS

| | | | |
|---|---|---|---|
| CN | 103158847 A | 6/2013 | |
| EP | 0 762 618 A1 | 3/1997 | |
| JP | 9-117117 | 5/1997 | |
| JP | 10-322945 | 12/1998 | |
| JP | 2002-511229 | 4/2002 | |
| JP | 2003-533162 | 11/2003 | |
| JP | 2004-516780 | 6/2004 | |
| JP | 2006-509488 | 3/2006 | |
| JP | 4085059 | 2/2008 | |
| JP | 2009-247180 | 10/2009 | |
| JP | 2012-217312 | 11/2012 | |
| JP | 2013-38944 | 2/2013 | |
| JP | 2014-60876 | 4/2014 | |
| JP | 2015-19496 | 1/2015 | |
| JP | 2015-61495 | 3/2015 | |
| JP | 2015-70767 | 4/2015 | |
| WO | WO 2011/128095 A2 | 10/2011 | |
| WO | WO 2014071854 A1 * | 5/2014 | F04B 35/04 |

* cited by examiner

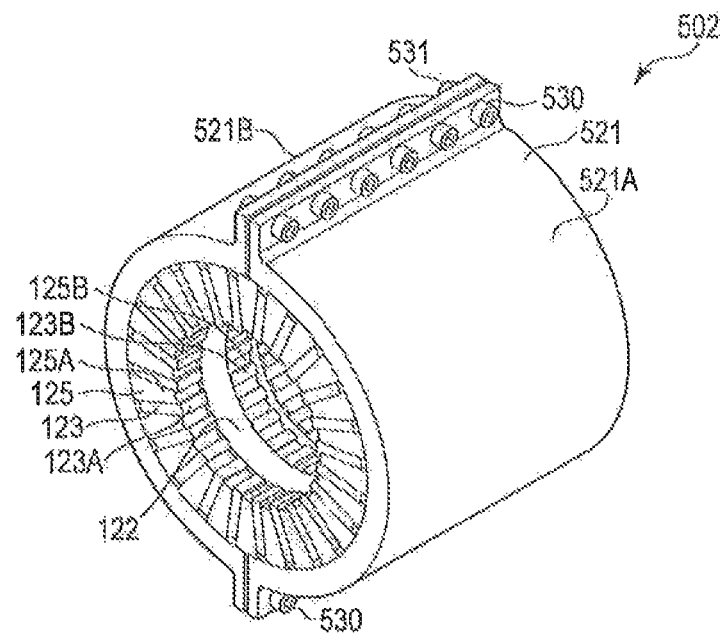
F I G. 20A
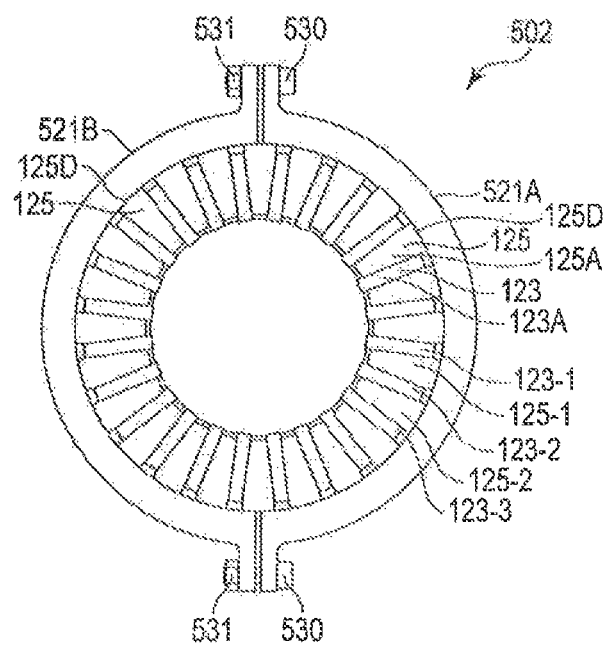
F I G. 20B

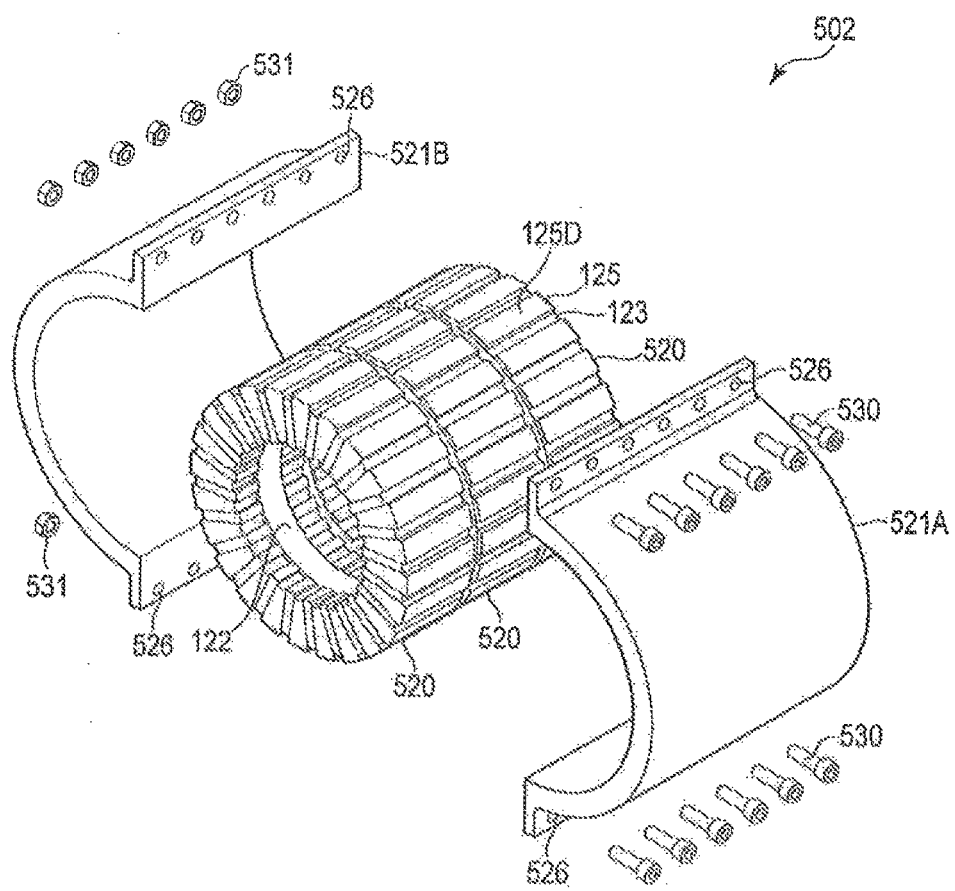
F I G. 21

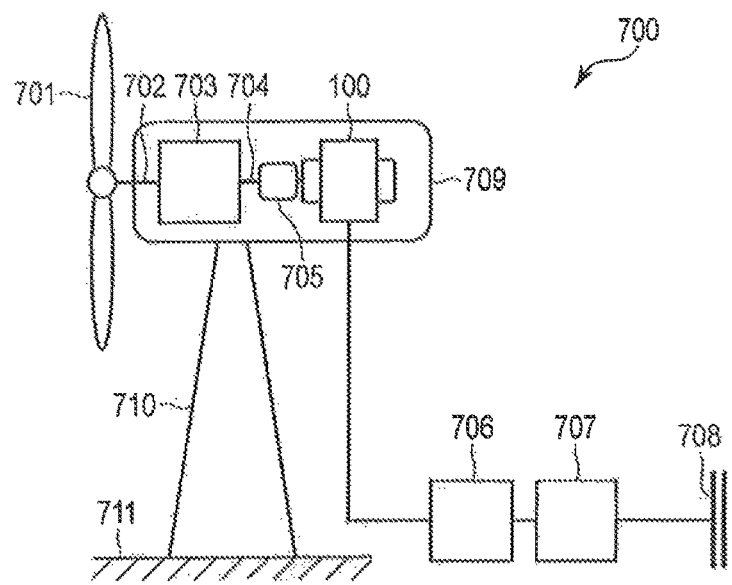
F I G. 24
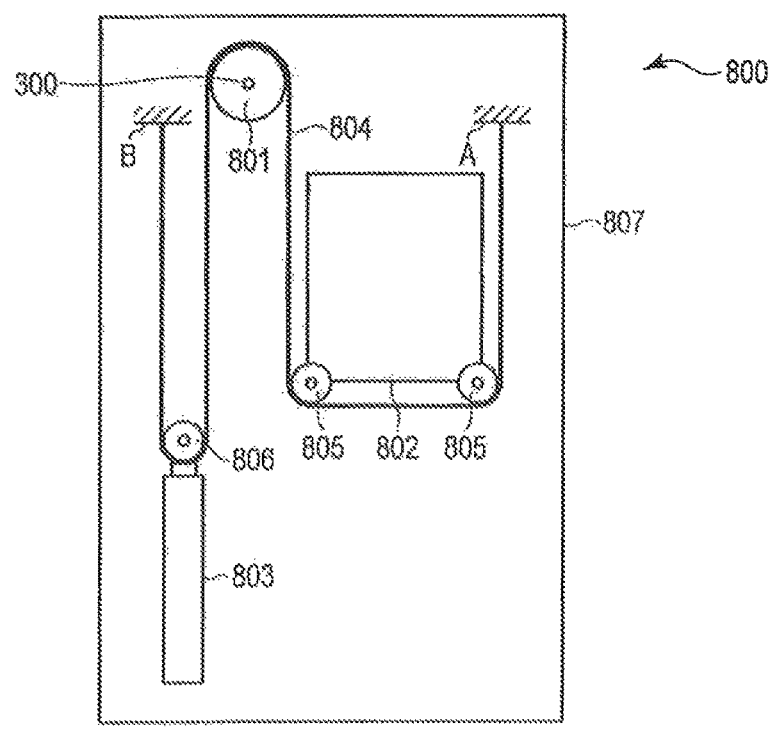
F I G. 25

ELECTRIC ROTATING MACHINE

CROSS-REFERENCE TO RELATED APPLICATIONS

This application is based upon and claims the benefit of priority from Japanese Patent Application No. 2014-113031, filed May 30, 2014, the entire contents of which are incorporated herein by reference.

FIELD

Embodiments described herein relate generally to a transversal flux electric rotating machine that generates a magnetic path along the axis of rotation thereof, and an electrically driven vehicle, wind turbine generator, and elevator device using the electric rotating machine.

BACKGROUND

Demands have arisen for further improving the performance of electromagnetic motors for reasons such as energy saving and $CO_2$ reduction, and the performance represented by areas such as downsizing, weight reduction, high efficiency, high torque, and high output are rapidly improving daily. When classified in accordance with the direction of a magnetic flux, the electromagnetic motors can be classified into (1) a radial flux motor, (2) an axial flux motor, and (3) a transversal flux motor. Of these motors, the radial flux motor is particularly superior in cost performance, and has conventionally been used in a wide variety of products in the world of industry as a typical mechanical element of a general-purpose actuator. Also, the axial flux motor has the structural feature that can cope with a complicated magnetic path arrangement in three-dimensional directions, but makes the use of widely-used conventional laminated steel difficult. Axial flux motors such as this are particularly applied to the field of medium/large-sized, low-profile, large-diameter motors.

Furthermore, the transversal flux motor has the following feature; a basic unit is formed by a rotor including a permanent magnet, and an armature (which forms a split toroidal core) including an annular coil formed around the rotation axis of the rotor, and a plurality of approximately U-shaped stator cores (to be referred to as U-shaped stator cores hereinafter) are formed so as to cover the annular coil on the circumference around the rotation axis, and two or more basic units are arranged along the rotation axis with a predetermined relative phase angle around the rotation axis. This arrangement can achieve a high torque by multiple poles relatively easily, and can achieve high-efficiency magnetic field generation by the split toroidal core structure. That is, when compared to the radial flux motor and axial flux motor requiring a stator core including a plurality of slots on the circumference around the rotation axis, a coil wound around this slot part, and a dead space for coil assembling and insertion, etc., the transversal flux motor only requires the plurality of U-shaped stator cores to be formed on the circumference around the rotation axis. This generally makes it easy to increase the number of poles. Also, the armature including the toroidal coil and U-shaped stator cores has a structure from which a magnetic flux generated by the coil hardly leaks outside. Since this increases the field generation efficiency of the coil, the transversal flux motor can be expected to be downsized more than the radial flux motor and axial flux motor having the coil end.

When the rotor rotates in the transversal flux motor, a magnetic force which intermittently changes its direction acts on the U-shaped stator cores in the rotation direction. This magnetic force vibrates the U-shaped stator cores. This vibration not only decreases the motor's strength, but also generates noise. Furthermore, as the torque increases, a cogging torque which causes torque variations generally increases as well, and this presumably further increases the generation of vibrations. Therefore, demands have arisen for reducing the generation of vibrations in the transversal flux motor.

BRIEF DESCRIPTION OF THE DRAWINGS

FIGS. 20A and 20B are respectively a perspective view and front view showing a stator according to the fifth embodiment;

FIG. 21 is an exploded perspective view showing the stator according to the fifth embodiment;

FIG. 24 is a view showing a wind turbine generator according to the seventh embodiment; and FIG. 25 is a view showing an elevator device according to the eighth embodiment.

DETAILED DESCRIPTION

Figure 1:
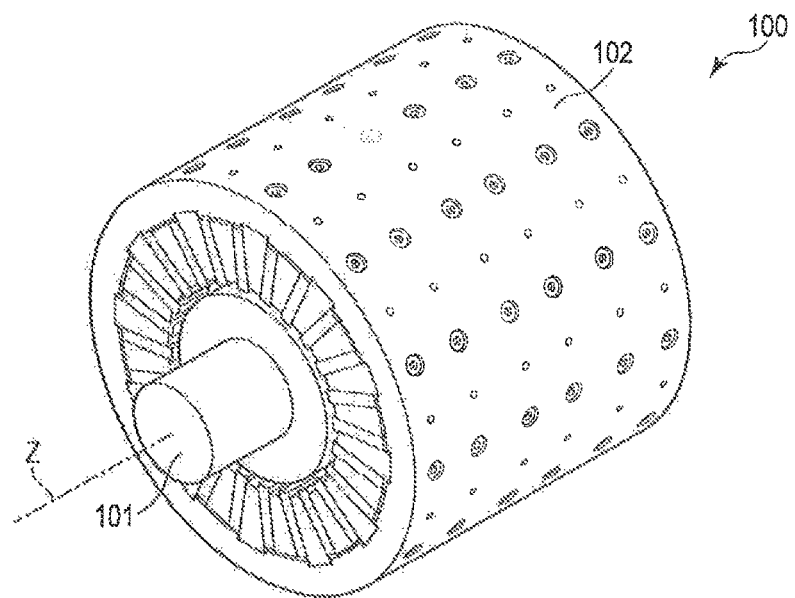
FIG. 1 is a perspective view showing an electric rotating machine according to the first embodiment.

According to an embodiment, an electric rotating machine includes a rotor element, an annular coil, a plurality of stator cores, and a plurality of wedge members. The rotor element is rotatable around a rotation axis. The coil is provided to be coaxial with the rotation axis. The plurality of stator cores are provided opposite to the rotor element and each includes a pair of magnetic pole parts opposing each other with the coil being interposed therebetween. Each of the plurality of wedge members is arranged between adjacent stator cores to apply preloads to the adjacent stator cores, the preloads containing components in a rotation direction of the rotor element and being opposite to each other.

Hereinafter, various embodiments will be described with reference to the accompanying drawings. In the following embodiments, like reference numerals denote like elements, and a repetitive explanation will be omitted.

First Embodiment

FIG. 1 schematically shows an electric rotating machine 100 according to the first embodiment. As shown in FIG. 1, the electric rotating machine 100 includes a rotor 101 supported by a bearing (not shown) so as to be rotatable around a rotation axis z, and a stator 102 which opposes the outer circumferential surface of the rotor 101 with a predetermined gap between them. The rotor 101 has an approximately cylindrical shape around the rotation axis z. The stator 102 has an approximately cylindrical shape coaxial with the rotation axis z, and is placed so as to cover the rotor 101 around the rotation axis z. The rotor 101 is positioned inside the stator 102.

Figure 2:
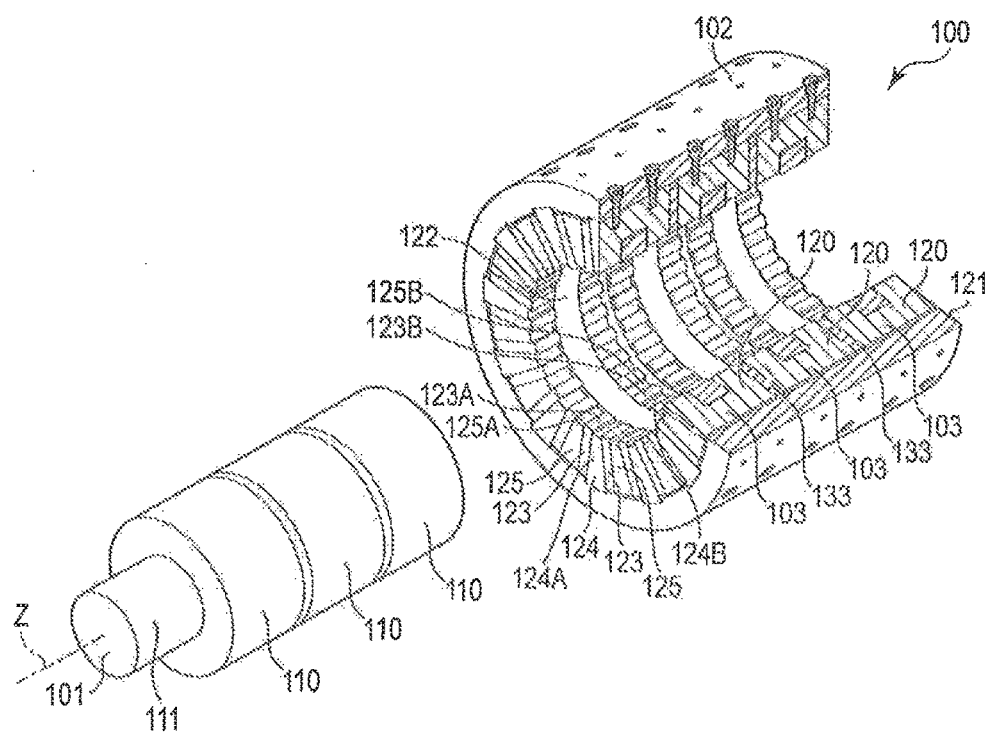
FIG. 2 is an exploded perspective view showing the electric rotating machine according to the first embodiment.

FIG. 2 schematically shows the electric rotating machine 100 in a state in which it is disassembled into the rotor 101 and stator 102 and the stator 102 is partially cut away. As shown in FIG. 2, the electric rotating machine 100 is a three-stage (three-phase) electric rotating machine in which three basic units 103 are arranged in the rotation-axis direction (the direction of the rotation axis z). Each basic unit 103 includes one rotor element 110, and one armature 120 opposing the rotor element 110. Note that the number of basic units 103 is determined in accordance with the design conditions, and can be an arbitrary integer that is two or more. The output and torque of the electric rotating machine 100 can easily be adjusted by changing the number of basic units 103.

The three rotor elements 110 are fixed to a shaft 111 extending along the rotation axis z. The shaft 111 is rotatably supported by the bearing (not shown). Accordingly, the rotor elements 110 can rotate around the rotation axis z. Each rotor element 110 includes a rotor core (not shown) and a permanent magnet (not shown). A plurality of magnetic poles are provided on the outer circumferential surface of the rotor element 110 so that N poles and S poles are alternately arranged.

The three armatures 120 are housed in an annular or cylindrical casing 121, and connected to each other by the casing 121. The material of the casing 121 can be any material which satisfies the mechanical strength required of the electric rotating machine 100. In this embodiment, the casing 121 is common to the three armatures 120. The casing 121 can be regarded as an element of each armature 120. Note that a plurality of casings 121 may be provided for a plurality of armatures 120. In this case, the plurality of casings 121 are fixed to each other by using combinations of bolts and nuts or an adhesive. Members 133 made of a nonmagnetic material may also be provided between the armatures 120.

Figure 3:
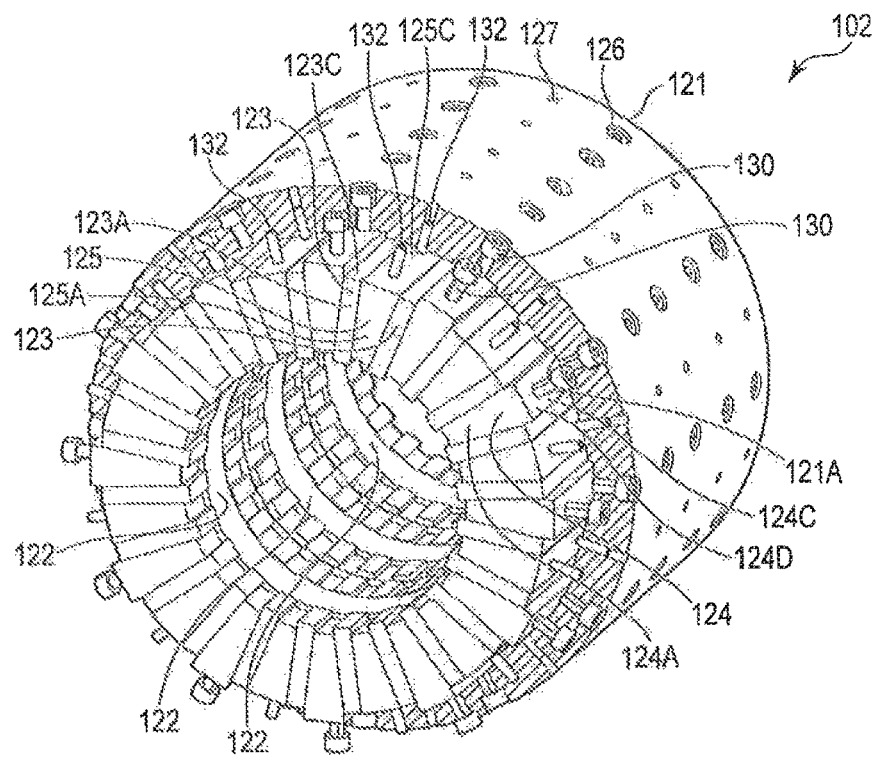
FIG. 3 is a perspective view showing a stator according to the first embodiment.
Figure 4:
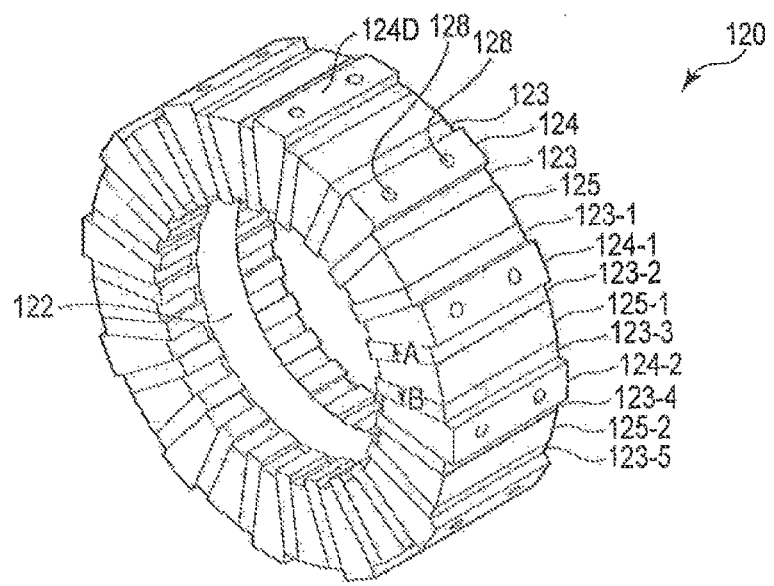
FIG. 4 is a perspective view showing an armature according to the first embodiment.
Figure 5:
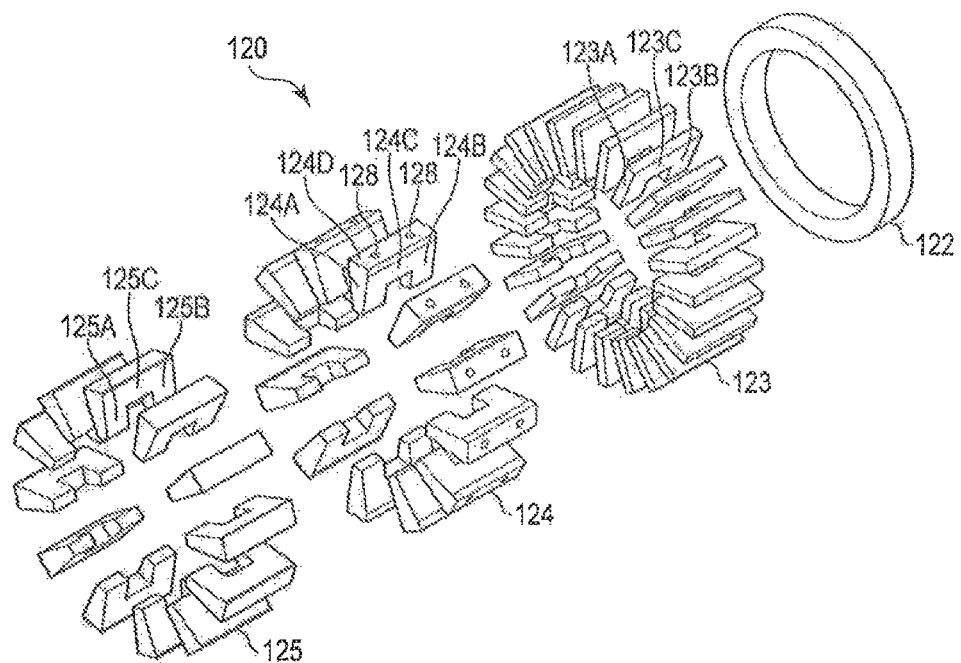
FIG. 5 is an exploded perspective view showing the armature according to the first embodiment.

FIG. 3 schematically shows the stator 102 in a state in which the casing 121 is partially cut away. FIG. 4 is a perspective view schematically showing one of the armatures 120 shown in FIG. 2. FIG. 5 is an exploded perspective view in which the armature 120 is disassembled in the rotation-axis direction. The three basic units 103 can have the same structure, so the two other armatures 120 can have the same structure as that of the armature 120 shown in FIGS. 4 and 5. As shown in FIG. 3, the armature 120 includes an armature coil 122, a plurality of stator cores 123, a plurality of core holders 124, and a plurality of wedge members 125.

The plurality of core holders 124 and the plurality of wedge members 125 are alternately arranged between the stator cores 123, and thereby the plurality of stator cores 123, the plurality of core holders 124, and the plurality of wedge members 125 form an integrated annular body as a whole. Specifically, as shown in FIG. 4, the plurality of stator cores 123, the plurality of core holders 124, and the plurality of wedge members 125 are arranged in the order of a stator core 123-1, core holder 124-1, stator core 123-2, wedge member 125-1, stator core 123-3, core holder 124-2, stator core 123-4, wedge member 125-2, stator core 123-5, and so on. The annular body is formed so as to cover the armature coil 122 around the rotation axis z.

In the example shown in FIG. 4, the number of stator cores 123 is 24, the number of core holders 124 is 12, and the number of wedge members 125 is 12. When the number of stator cores 123 is 24, the number of magnetic poles of the armature 120 is, for example, 48. In this example, the stator cores 123 are arranged at a circumferential pitch of 15 degrees, the core holders 124 are arranged at a circumferential pitch of 30 degrees, and the wedge members 125 are arranged at a circumferential pitch of 30 degrees.

As shown in FIG. 5, the armature coil 122 is formed into an annular shape around the rotation axis z. That is, the armature coil 122 is a toroidal coil coaxial with the rotation axis z. The armature coil 122 is supported by a support member (not shown), and fixed to the annular body. The armature coil 122 can be made of a conductive material such as copper, aluminum, or an alloy containing at least one of copper and aluminum.

The stator cores 123 are arranged so as to oppose the outer circumferential surface of the rotor element 110 with a predetermined gap between them. Each of the stator cores 123 is formed into an approximate U shape, and includes a pair of magnetic pole parts 123A and 123B opposing each other in the rotation-axis direction with the armature coil 122 being interposed between them, and an outer circumferential part 123C positioned between the magnetic pole parts 123A and 123B. The magnetic pole part 123A extends from one end of the outer circumferential part 123C toward the rotor element 110 (i.e., in the radial direction pointing to the rotation axis z), and the magnetic pole part 123B extends from the other end of the outer circumferential part 123C toward the rotor element 110. The magnetic pole parts 123A and 123B oppose the outer circumferential surface of the rotor element 110 with a predetermined gap between them. The stator core 123 is made of a ferromagnetic material.

The core holders 124 form first support members for fixing the stator cores 123 in a contact state. Each core holder 124 is formed into an approximate U shape. The core holder 124 includes first and second end parts 124A and 124B opposing each other with the armature coil 122 being interposed between them, and an outer circumferential part 124C positioned between the first and second end parts 124A and 124B. The first end part 124A extends from one end of the outer circumferential part 124C toward the rotor element 110, and the second end part 124B extends from the other end of the outer circumferential part 124C toward the rotor element 110. The first and second end parts 124A and 124B oppose the rotor element 110. The core holder 124 narrows toward the rotor element 110. Specifically, the width of the core holder 124 in the rotation direction decreases toward the rotor element 110. The sectional shape of the core holder 124 in a plane perpendicular to the rotation axis z is an approximate fan shape or trapezoidal shape. Screw holes 128 are formed in an outer circumferential surface 124D of the core holder 124. The core holder 124 is made of a nonmagnetic material. More preferably, the core holder 124 is made of an electrically insulating nonmagnetic material.

As shown in FIG. 3, the core holder 124 is fixed to the casing 121 in a contact state. The casing 121 forms a second support member for fixing the core holder 124 in a contact state. The core holder 124 is fixed to the casing 121 in a state in which the outer circumferential surface 124D is in contact with an inner circumferential surface 121A of the casing 121. In this embodiment, the core holder 124 is fastened to the casing 121 by bolts 130. A plurality of through holes 126 are formed in the casing 121. The bolt 130 is inserted into the through hole 126 from outside the casing 121, and is threadably engaged with the screw hole 128 of the core holder 124. In addition, a plurality of screw holes 127 are formed in the casing 121.

The core holder 124 is placed between two adjacent stator cores 123, and fixes the stator cores 123 in a contact state. The stator cores 123 can be fixed to the core holder 124 by an optimum method selected in accordance with the acting torque or machine dimensions. As the fixing method, bolt fastening, adhesion, or the like is used. In a state in which the stator cores 123 are fixed to the core holder 124, the first end part 124A, second end part 124B, and outer circumferential part 124C of the core holder 124 are respectively in contact with the magnetic pole part 123A, magnetic pole part 123B, and outer circumferential part 123C of the stator core 123. The stator cores 123 are thus fixed to the casing 121 by the core holder 124. Consequently, the vicinity of the outer circumferential part 123C of the stator core 123 is supported and fixed with high rigidity.

Each wedge member 125 is formed into an approximate U shape. The wedge member 125 includes first and second end parts 125A and 125B opposing each other with the armature coil 122 being interposed between them, and an outer circumferential part 125C positioned between the first and second end parts 125A and 125B. The first end part 125A extends from one end of the outer circumferential part 125C toward the rotor element 110, and the second end part 125B extends from the other end of the outer circumferential part 125C toward the rotor element 110. The first and second end parts 125A and 125B oppose the rotor element 110. The wedge member 125 narrows toward the rotor element 110. Specifically, the width of the wedge member 125 in the rotation direction decreases toward the rotor element 110. The sectional shape of the wedge member 125 in the plane perpendicular to the rotation axis z is an approximate fan shape or trapezoidal shape. The wedge member 125 is made of a nonmagnetic material. More preferably, the wedge member 125 is made of an electrically insulating nonmagnetic material.

The wedge member 125 is placed between two adjacent stator cores 123, and fixed to the stator cores 123 in a contact state. As the fixing method, bolt fastening, adhesion, or the like is used. The first end part 125A, second end part 125B, and outer circumferential part 125C of the wedge member 125 are respectively in contact with the magnetic pole part 123A, magnetic pole part 123B, and outer circumferential part 123C of the stator core 123. A setscrew 132 is threadably engaged with the screw hole 127 of the casing 121 from outside the casing 121. The distal end of the setscrew 132 comes in contact with the outer circumferential part 125C of the wedge member 125, and the wedge member 125 is pressed toward the rotor element 110 by the setscrew 132. That is, a preload containing a radial-direction component pointing to the rotation axis z is applied to the wedge member 125. Consequently, preloads containing rotation-direction components are applied to the two stator cores 123 in contact with the wedge member 125. The stator cores 123 receive preloads in opposite directions. For example, the stator core 123-2 shown in FIG. 4 is applied a preload from the wedge member 125-1 in a direction indicated by an arrow A, and pressed against the core holder 124-1. The stator core 123-3 is applied a preload from the wedge member 125-1 in a direction indicated by an arrow B, and pressed against the core holder 124-2. By thus forming the wedge member 125 between the stator cores 123, the vicinities of the magnetic pole parts 123A and 123B of the stator cores 123 can be fixed with high rigidity.

In this embodiment, the stator cores 123, core holders 124, and wedge members 125 form an integrated annular body, and the wedge member 125 is placed between the stator cores 123. Therefore, the vicinities of the magnetic pole parts 123A and 123B of the stator core 123 are supported and fixed with high rigidity. In addition, the stator core 123 is fixed to the casing 121 by using the core holder 124. Accordingly, the position of the stator core 123 can be further stabilized in an assembling process, so the vicinity of the outer circumferential part 123C of the stator core 123 is supported and fixed with high rigidity. This embodiment can thus improve the rigidity for supporting the stator core 123.

When using the electric rotating machine 100 as a motor, a power supply (not shown) applies a three-phase alternating current to the electric rotating machine 100. As a consequence, the rotor 101 rotates. As the rotor 101 rotates, a magnetic force which intermittently changes its direction acts on the magnetic pole parts 123A and 123B of the stator core 123 in the rotation direction. As described above, the stator core 123 is supported and fixed with high rigidity in this embodiment. Therefore, it is possible to prevent the stator core 123 from vibrating due to the magnetic force acting on the magnetic pole parts 123A and 123B when the electric rotating machine 100 is driven. When using an adhesive for fixing the wedge member 125 and stator core 123, the adhesive gives a vibration damping effect, so the generation of vibrations can further be reduced. Since the generation of vibrations is reduced, the generation of noise caused by the vibrations can be reduced as well. This makes it possible to prevent a decrease in strength caused by the vibrations.

Furthermore, heat generated by a copper loss of the armature coil 122 caused when an electric current is supplied, generated by an iron loss of the stator core 123 caused by rotational driving, or generated by a magnetic flux generated from the armature coil 122, is extracted (radiated)

by the casing 121 by heat transfer from the core holder 124. Therefore, heat removal can effectively be performed.

Note that the same effects as described above can be obtained even when using the electric rotating machine 100 as a generator.

In the electric rotating machine 100 according to this embodiment as described above, the plurality of stator cores 123, the plurality of core holders 124, and the plurality of wedge members 125 come in contact with each other and form an integrated annular body as a whole, and the plurality of core holders 124 are fixed to the casing 121. This structure improves the rigidity for supporting the stator core 123. As a result, it is possible to reduce vibrations generated when the electric rotating machine 100 is driven.

Note that this embodiment has been explained by taking, as an example, the case in which the number of stator cores 123 is 24 and the number of magnetic poles of the rotor element 110 is 48 in each of the basic units 103. However, the number of stator cores 123 and the number of magnetic poles of the rotor element 110 are not limited to those of this example, and optimum numbers can be selected in accordance with the designed specifications of an application device. The numbers of core holders 124 and wedge members 125 change in accordance with the number of stator cores 123.

Second Embodiment

In the second embodiment, an explanation of the same parts as in the first embodiment will be omitted as needed, and the explanations will focus on those parts different from the first embodiment.

Figure 6:
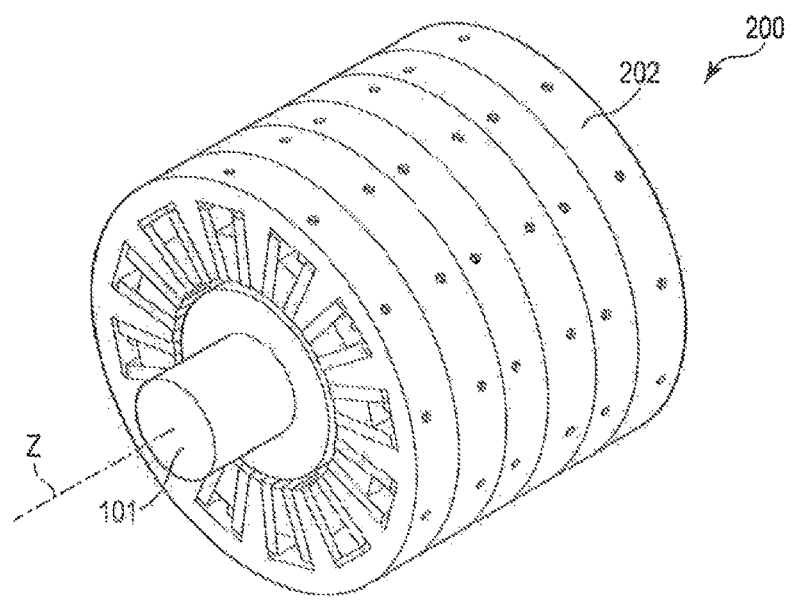
FIG. 6 is a perspective view showing an electric rotating machine according to the second embodiment.

FIG. 6 schematically shows an electric rotating machine 200 according to the second embodiment. As shown in FIG. 6, the electric rotating machine 200 includes a rotor 101 supported by a bearing (not shown) so as to be rotatable around a rotation axis z, and a stator 202 which opposes the outer circumferential surface of the rotor 101 with a predetermined gap between them. The stator 202 has an approximately cylindrical shape coaxial with the rotation axis z. The rotor 101 is positioned inside the stator 202.

Figure 7:
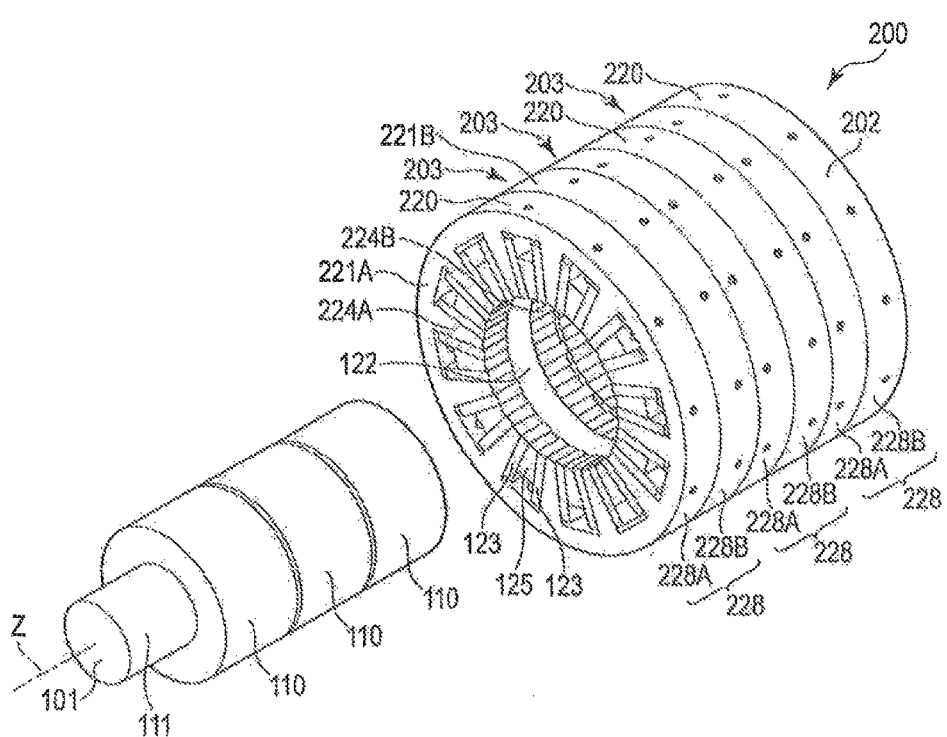
FIG. 7 is an exploded perspective view showing the electric rotating machine according to the second embodiment.

FIG. 7 schematically shows the electric rotating machine 200 in a state in which it is disassembled into the rotor 101 and stator 202. As shown in FIG. 7, the electric rotating machine 200 is a three-stage (three-phase) electric rotating machine in which three basic units 203 are arranged in the rotation-axis direction. Each basic unit 203 includes one rotor element 110, and one armature 220 opposing the rotor element 110. Note that the number of basic units 203 is determined in accordance with the design conditions, and can be an arbitrary integer that is two or more.

The armatures 220 include core holder integrated casings 228, and are connected to each other by the core holder integrated casings 228. The core holder integrated casings 228 are fixed to each other by using a method such as bolt fastening, adhesion, or a combination thereof. The core holder integrated casing 228 is made of a nonmagnetic material. More preferably, the core holder integrated casing 228 is made of an electrically insulating nonmagnetic material.

Figure 8:
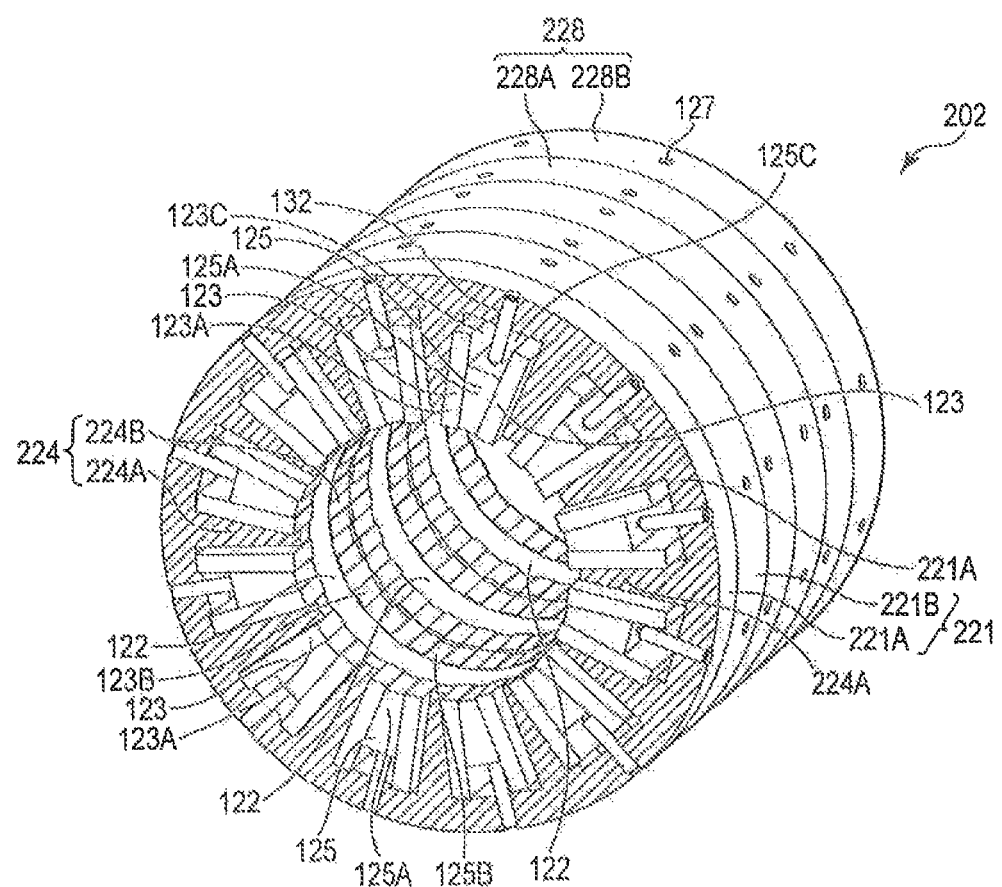
FIG. 8 is a perspective view showing a stator according to the second embodiment.
Figure 9:
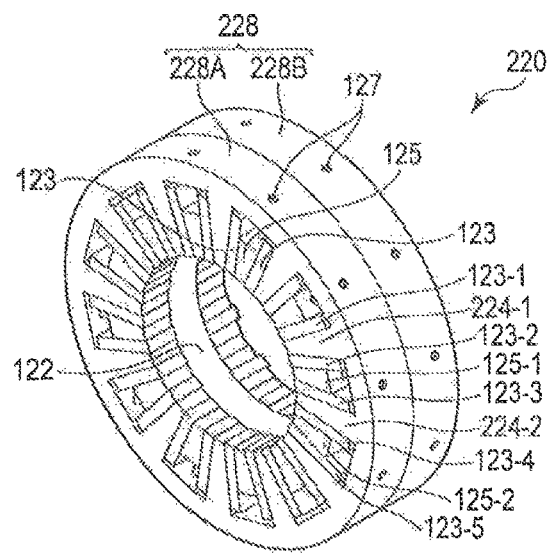
FIG. 9 is a perspective view showing an armature according to the second embodiment.
Figure 10:
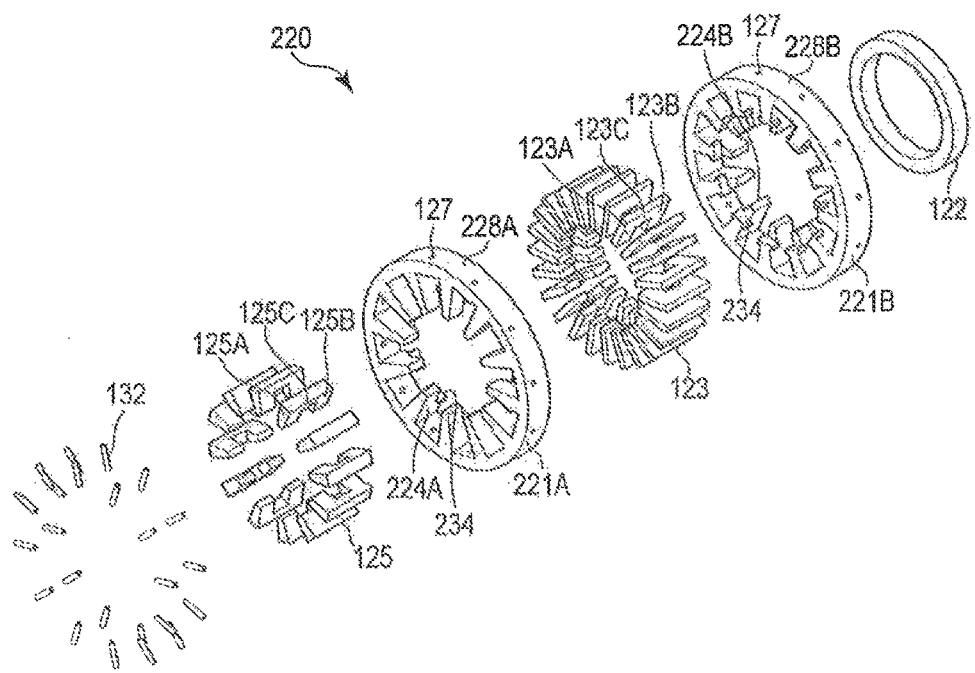
FIG. 10 is an exploded perspective view showing the armature according to the second embodiment.

FIG. 8 schematically shows the stator 202 in a state in which the core holder integrated casing 228 is partially cut away. FIG. 9 is a perspective view schematically showing one of the armatures 220 shown in FIG. 7. FIG. 10 is an exploded perspective view in which the armature 220 is disassembled in the rotation-axis direction. The three basic units 203 can have the same structure, so the two other armatures 220 can have the same structure as that of the armature 220 shown in FIGS. 9 and 10. As shown in FIG. 9, the armature 220 further includes an armature coil 122, a plurality of stator cores 123, and a plurality of wedge members 125. The armature coil 122, the plurality of stator cores 123, and the plurality of wedge members 125 are housed in the core holder integrated casing 228.

As shown in FIG. 10, the core holder integrated casing 228 includes first and second parts 228A and 228B opposing each other in the rotation-axis direction. The first part 228A includes a core holder part 224A and outer circumferential part 221A. The second part 228B includes a core holder part 224B and outer circumferential part 221B. Projections 234 for positioning the stator cores 123 are formed on the core holder parts 224A and 224B. The projections 234 determine the positions of the stator cores 123 in the radial direction.

The first and second parts 228A and 228B are integrated by sandwiching the armature coil 122, stator cores 123, and wedge members 125 in the rotation-axis direction, and fixed by using a method such as bolt fastening, adhesion, or a combination thereof. As shown in FIG. 8, an approximately U-shaped core holder 224 is formed by combining the core holder parts 224A and 224B. The core holder 224 forms a first support member for fixing the stator core 123 in a contact state. Also, an approximately annular casing 221 is formed by combining the outer circumferential part 221A and 221B. The casing 221 forms a second support member for fixing the core holder 224 in a contact state. That is, the core holder integrated casing 228 is formed by integrating the core holders 224 and casing 221. Each of the core holders 224 extends from the inner circumferential surface of the casing 221 toward the rotor element 110. The core holder 224 can have the same shape as that of the core holder 124 according to the first embodiment, except for the projection 234. Note that at least one of the core holders 224 may also be a member different from the core holder integrated casing 221. This core holder 224 is fixed to the casing 221 in a contact state by using a method such as bolt fastening or adhesion.

The plurality of core holders 224 and the plurality of wedge members 125 are alternately arranged between the stator cores 123, and the plurality of stator cores 123, the plurality of core holders 224, and the plurality of wedge members 125 form an integrated annular body as a whole. Specifically, as shown in FIG. 9, the plurality of stator cores 123, the plurality of core holders 224, and the plurality of wedge members 125 are arranged in the order of a stator core 123-1, core holder 224-1, stator core 123-2, wedge member 125-1, stator core 123-3, core holder 224-2, stator core 123-4, wedge member 125-2, stator core 123-5, and so on.

As shown in FIG. 10, a plurality of screw holes 127 are formed in the core holder integrated casing 228. As shown in FIG. 8, a setscrew 132 is threadably engaged with the screw hole 127 from outside the core holder integrated casing 228. The distal end of the setscrew 132 comes in contact with an outer circumferential part 125C of the wedge member 125, and the wedge member 125 is pressed toward the rotor element 110 by the setscrew 132. Consequently, preloads containing rotation-direction components are applied to two stator cores 123 in contact with the wedge member 125. The stator cores 123 receive preloads in opposite directions. For example, the stator core 123-2 shown in FIG. 9 receives a preload from the wedge member 125-1 toward the core holder 224-1. The stator core 123-3 receives a preload from the wedge member 125-1 toward the core holder 224-2. By thus forming the wedge member 125 between the stator cores 123, the vicinities of the magnetic pole parts 123A and 123B of the stator cores 123 can be fixed with high rigidity.

In the electric rotating machine 200 according to this embodiment as described above, the plurality of stator cores 123, the plurality of core holders 224, and the plurality of wedge members 125 come in contact with each other and form an integrated annular body as a whole, and the plurality of core holders 224 are integrated with the casing 221. This structure improves the rigidity for supporting the stator core 123. As a result, it is possible to reduce vibrations generated when the electric rotating machine 200 is driven. Since the generation of vibrations is reduced, the generation of noise caused by vibrations can be reduced as well, so it is possible to prevent a decrease in strength caused by vibrations.

Furthermore, heat generated by a copper loss of the armature coil 122 caused when an electric current is supplied and generated by an iron loss of the stator core 123 caused by rotational driving or a magnetic flux generated from the armature coil 122 is extracted (radiated) by the casing 221 by heat conduction from the core holder 224. Therefore, heat removal can effectively be performed. Consequently, this embodiment in which the core holder 224 is integrated with the casing 221 can achieve the rigidity for supporting the stator core 123 and the heat extraction performance higher than those of the first embodiment.

Third Embodiment

In the third embodiment, an explanation of the same parts as in the first embodiment will be omitted as needed, and the explanations will focus on those parts different from the first embodiment.

Figure 11:
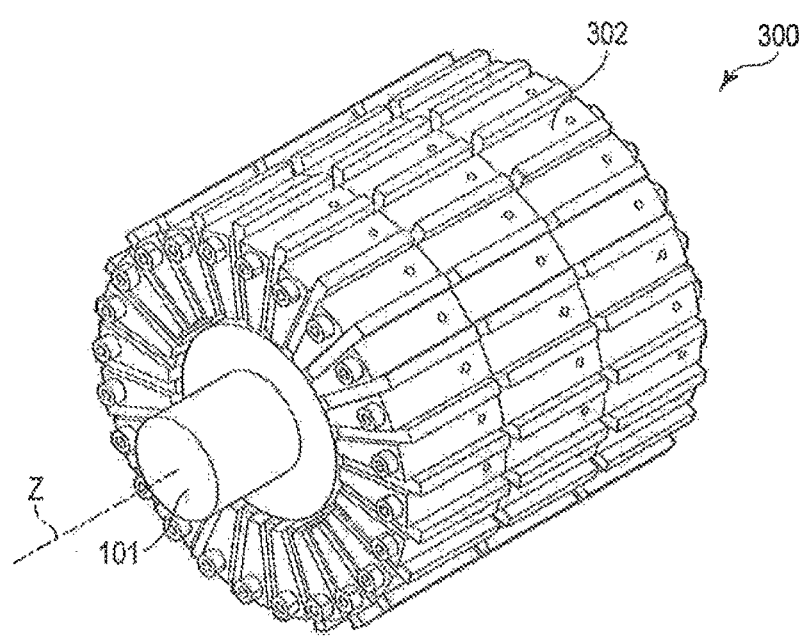
FIG. 11 is a perspective view showing an electric rotating machine according to the third embodiment.

FIG. 11 schematically shows an electric rotating machine 300 according to the third embodiment. As shown in FIG. 11, the electric rotating machine 300 includes a rotor 101 supported by a bearing (not shown) so as to be rotatable around a rotation axis z, and a stator 302 which opposes the outer circumferential surface of the rotor 101 with a predetermined gap between them. The stator 302 has an approximately cylindrical shape, and is arranged to be coaxial with the rotation axis z. The rotor 101 is positioned inside the stator 302.

Figure 12:
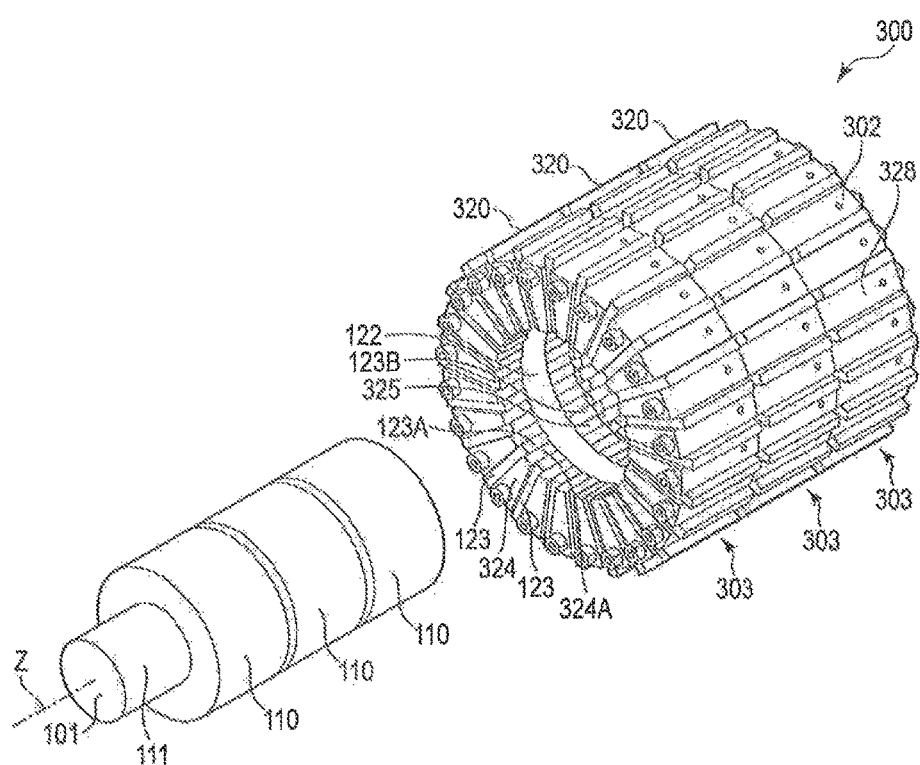
FIG. 12 is an exploded perspective view showing the electric rotating machine according to the third embodiment.

FIG. 12 schematically shows the electric rotating machine 300 in a state in which it is disassembled into the rotor 101 and stator 302. As shown in FIG. 12, the electric rotating machine 300 is a three-stage (three-phase) electric rotating machine in which three basic units 303 are arranged in the rotation-axis direction. Each basic unit 303 includes one rotor element 110, and one armature 320 opposing the rotor element 110. Note that the number of basic units 303 is determined in accordance with the design conditions, and can be an arbitrary integer that is two or more.

Figure 13:
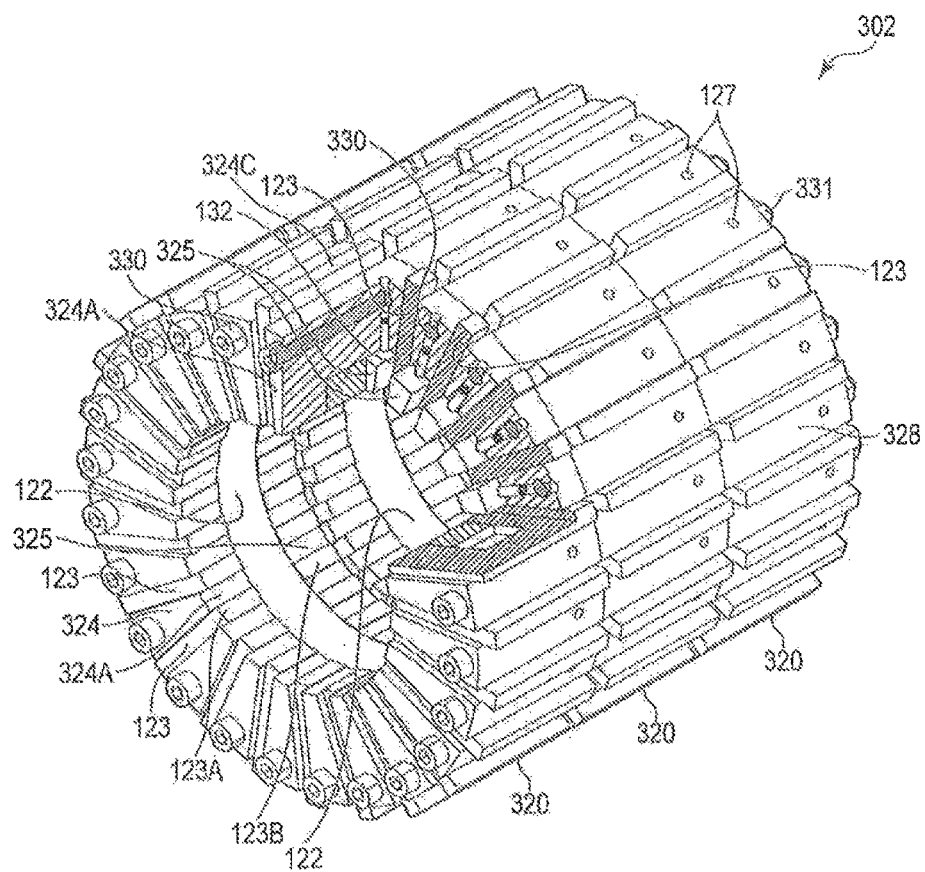
FIG. 13 is a perspective view showing a stator according to the third embodiment.
Figure 14A:
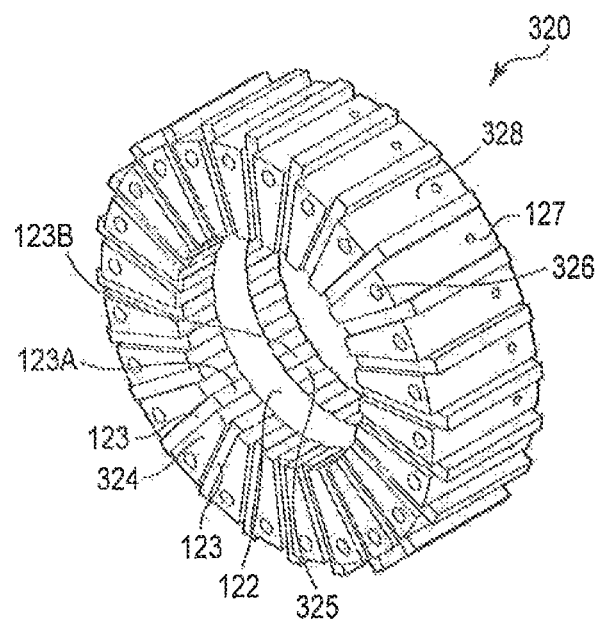
FIGS. 14A and 14B are perspective views showing an armature according to the third embodiment in different directions.
Figure 14B:
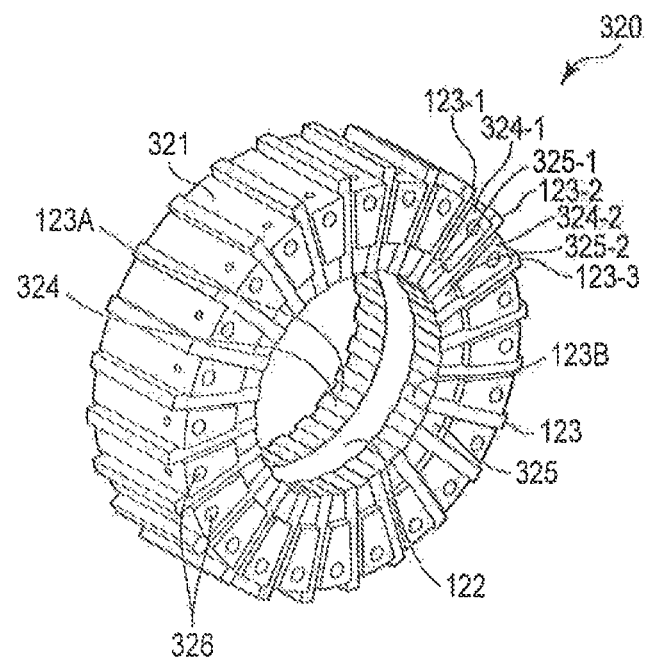
Figure 15:
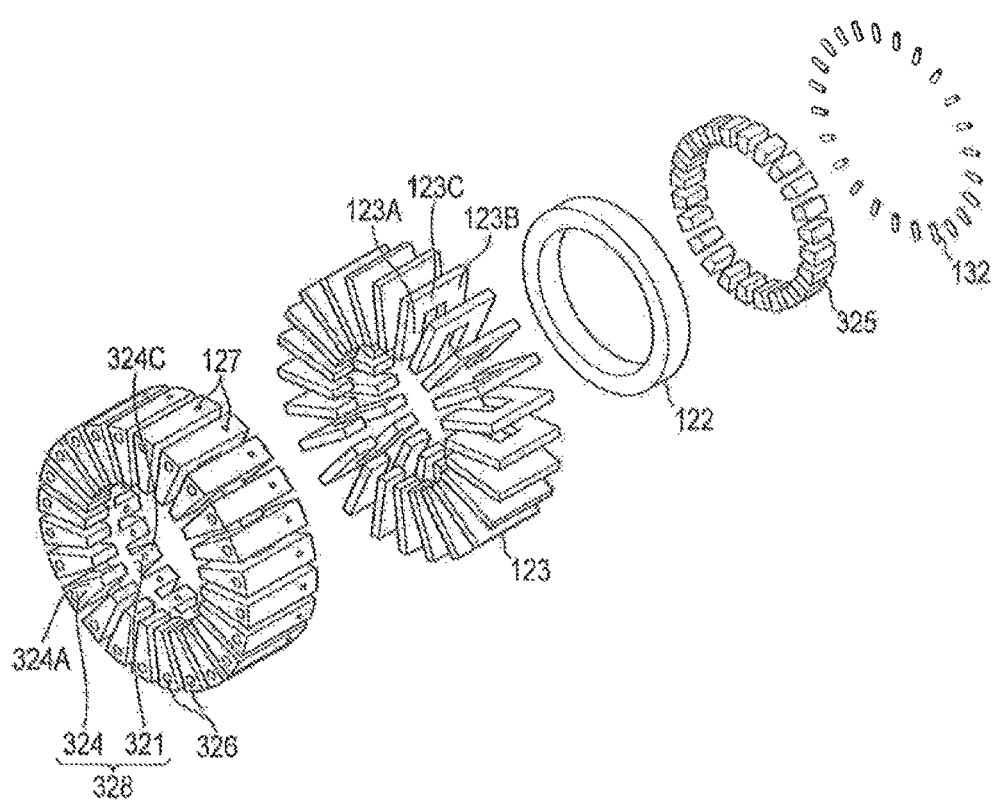
FIG. 15 is an exploded perspective view showing the armature according to the third embodiment.

FIG. 13 schematically shows the stator 302 in a state in which it is partially cut away. FIGS. 14A and 14B are perspective views schematically showing one of the three armatures 320 shown in FIG. 12 in different directions. FIG. 15 is an exploded perspective view in which the armature 320 is disassembled in the rotation-axis direction. The three basic units 303 can have the same structure, so the two other armatures 320 can have the same structure as that of the armature 320 shown in FIGS. 14A, 14B, and 15.

As shown in FIG. 14A, the armature 320 includes an armature coil 122, a plurality of stator cores 123, a core holder integrated casing 328, and a plurality of wedge members 325. As shown in FIG. 15, the core holder integrated casing 328 is formed by integrating a casing 321 and a plurality of core holders 324. The core holder 324 forms a first support member for fixing the stator core 123 in a contact state, and the casing 321 forms a second support member for fixing the core holder 324 in a contact state. The core holder integrated casing 328 is made of a nonmagnetic material. More preferably, the core holder integrated casing 328 is made of an electrically insulating nonmagnetic material. Note that at least one of the core holders 324 may also be a member different from the core holder integrated casing 328. This core holder 324 is fixed to the casing 321 in a contact state by using a method such as bolt fastening or adhesion.

The casing 321 is an annular member. The core holders 324 are arranged so as to cover the casing 321 around the rotation axis z. The casing 321 is positioned between magnetic pole parts 123A and 123B of the stator core 123. The core holder 324 is formed into an approximate L shape. The core holder 324 includes an outer circumferential part 324C, and an end part 324A extending from one end of the outer circumferential part 324C toward the rotor element 110. The end part 324A opposes the rotor element 110. The core holder 324 narrows toward the rotor element 110. Specifically, the width of the core holder 324 in the rotation direction decreases toward the rotor element 110. The sectional shape of the core holder 324 in a plane perpendicular to the rotation axis z is an approximate fan shape or trapezoidal shape. A through hole 326 is formed in the side surface of the core holder integrated casing 328, and a screw hole 127 is formed in the outer circumferential surface of the core holder integrated casing 328. The through holes 326 are used to connect and fix the three armatures 320. As shown in FIG. 13, the armatures 320 are connected and fixed to each other by bolts 330 and nuts 331. Each bolt 330 is inserted sideways into the through holes 326 of the three armatures 320, and engaged with the nut 331.

The wedge member 325 has an approximately square pillar shape which narrows toward the rotor element 110. The width of the wedge member 325 in the rotation direction decreases toward the rotor element 110. The sectional shape of the wedge member 325 in a plane perpendicular to the rotation axis z is an approximate fan shape or trapezoidal shape.

Both the core holder 324 and wedge member 325 are arranged between two adjacent stator cores 123. The end part 324A and outer circumferential part 324C of the core holder 324 are respectively in contact with the magnetic pole part 123A and an outer circumferential part 123C of the stator core 123, and the wedge member 325 is in contact with the magnetic pole part 123B of the stator core 123. As shown in FIG. 14B, a plurality of sets of the core holders 324 and wedge members 325 and the plurality of stator cores 123 are alternately arranged, and the plurality of stator cores 123, the plurality of core holders 324, and the plurality of wedge members 325 form an integrated annular body as a whole. Specifically, as shown in FIG. 14B, the plurality of stator cores 123, the plurality of core holders 324, and the plurality of wedge members 325 are arranged in the order of a stator core 123-1, a set of a core holder 324-1 and wedge member 325-1, a stator core 123-2, a set of a core holder 324-2 and wedge member 325-2, stator core 123-3, and so on.

In the example shown in FIG. 14B, the number of stator cores 123 is 24, the number of core holders 324 is 24, and the number of wedge members 325 is 24. In this example, the stator cores 123 are arranged at a circumferential pitch of 15 degrees, the core holders 324 are arranged at a circumferential pitch of 15 degrees, and the wedge members 325 are arranged at a circumferential pitch of 15 degrees.

Note that the explanation has been made by taking the case in which the number of stator cores 123 included in each armature 320 is 24 as an example. However, the number of stator cores 123 is not limited to that of this example, and an optimum number can be selected in accordance with the designed specifications of an application device. The numbers of core holders 324 and wedge members 325 change in accordance with the number of stator cores 123.

As shown in FIG. 13, a setscrew 132 is threadably engaged with the screw hole 127 of the core holder integrated casing 328 from outside the casing 321. The distal end of the setscrew 132 comes in contact with the wedge member 325, and the wedge member 325 is pressed toward the rotor element 110 by the setscrew 132. Consequently, preloads containing rotation-direction components are applied to the two stator cores 123 (more specifically, the magnetic pole parts 123B of the stator cores 123) in contact with the wedge member 325. The stator cores 123 receive preloads in opposite directions. For example, the stator core 123-2 shown in FIG. 14B receives a preload from the wedge member 325-2 toward the wedge member 325-1. The stator core 123-3 receives a preload from the wedge member 325-2 toward the wedge member 325-3. By thus inserting the wedge member 125 between the stator cores 123, the vicinities of the magnetic pole parts 123B of the stator cores 123 can be fixed with high rigidity. In addition, the magnetic pole part 123A of the stator core 123 is sandwiched between the core holders 324, so the vicinity of the magnetic pole part 123A is also fixed with high rigidity.

In the electric rotating machine 300 according to this embodiment as described above, the plurality of stator cores 123, the plurality of core holders 324, and the plurality of wedge members 325 come in contact with each other and form an integrated annular body as a whole, and the plurality of core holders 324 are integrated with the casing 321. This structure improves the rigidity for supporting the stator core 123. As a result, it is possible to reduce vibrations generated when the electric rotating machine 300 is driven. Since the generation of vibrations is reduced, the generation of noise caused by the vibrations can be reduced as well, so it is possible to prevent a decrease in strength caused by the vibrations.

Furthermore, heat generated by a copper loss of the armature coil 122 caused when an electric current is supplied, generated by an iron loss of the stator core 123 caused by rotational driving, or by a magnetic flux generated from the armature coil 122, is extracted by the casing 321 by heat conduction from the core holder 324, and is further extracted by the stator core 123 as well. Therefore, heat removal can effectively be performed.

Fourth Embodiment

The fourth embodiment is a modification of the first embodiment. The difference of the fourth embodiment from the first embodiment is a partial structure of an armature. In the fourth embodiment, an explanation of the same parts as in the first embodiment will be omitted as needed, and the explanations will focus on those parts different from the first embodiment.

Figure 16:
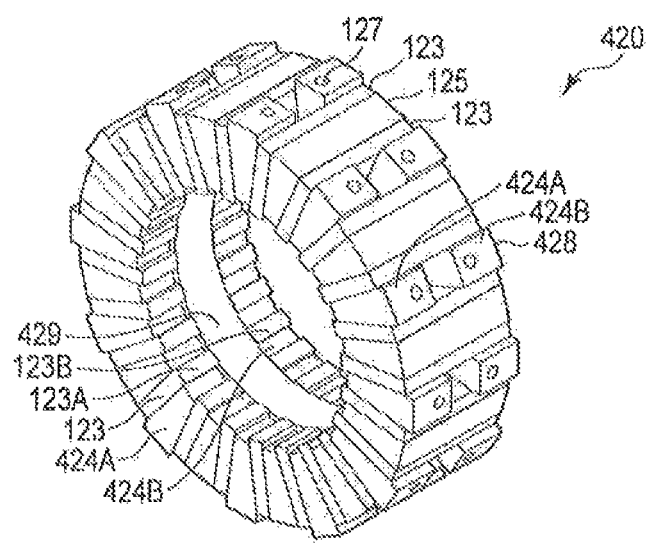
FIG. 16 is a perspective view showing an armature according to the fourth embodiment.

FIG. 16 schematically shows an armature 420 of an electric rotating machine according to the fourth embodiment. As shown in FIG. 16, the armature 420 includes an armature coil 122 (not shown in FIG. 16), a plurality of stator cores 123, a core holder integrated casing 428, and a plurality of wedge members 125.

Figure 17:
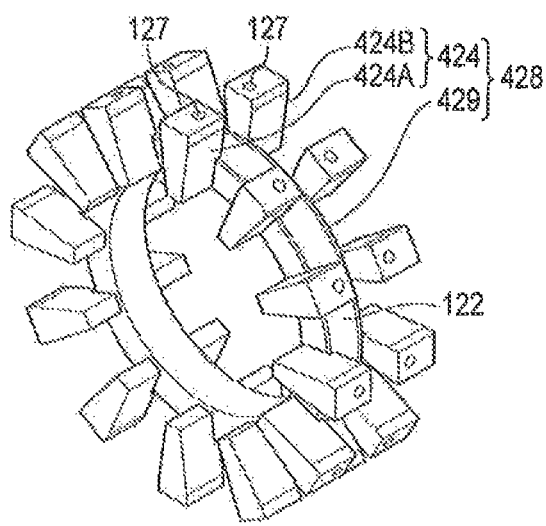
FIG. 17 is a perspective view showing a core holder integrated casing according to the fourth embodiment.
Figure 18:
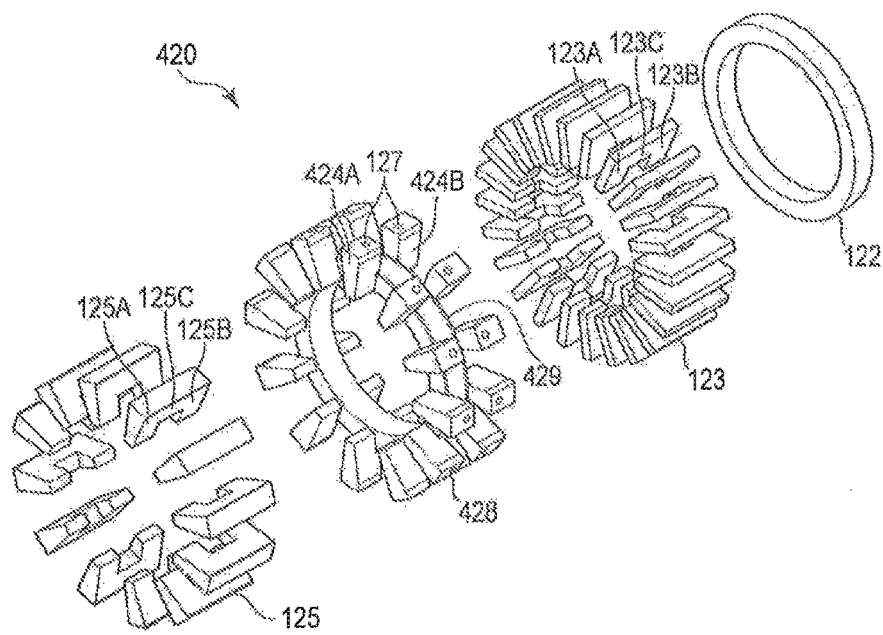
FIG. 18 is an exploded perspective view showing the armature according to the fourth embodiment.

FIG. 17 is a perspective view schematically showing the core holder integrated casing 428. FIG. 18 is an exploded perspective view in which the armature 420 is disassembled in the rotation-axis direction. As shown in FIG. 17, the core holder integrated casing 428 includes a coil holder 429 for supporting the armature coil 122, and a plurality of core holders 424 as first support members for fixing the plurality of stator cores 123. The core holder integrated casing 428 is formed by integrating the coil holder 429 and the plurality of core holders 424. The core holder integrated casing 428 is formed by a nonmagnetic material. More preferably, the core holder integrated casing 428 is formed by an electrically insulating nonmagnetic material. Note that at least one of the core holders 424 may also be a member different from the core holder integrated casing 428. This core holder 424 is fixed to the coil holder 429 in a contact state by using a method such as bolt fastening or adhesion. More preferably, the core holder 424 is formed by integration processing.

The armature coil 122 is wound around the coil holder 429, and fixed to the coil holder 429 in a contact state. The coil holder 429 forms a third support member for fixing the armature coil 122 in a contact state. Each core holder 424 includes a pair of core holder parts 424A and 424B opposing each other with the coil holder 429 being interposed between them. The core holder part 424A is formed on one end face of the coil holder 429, and the core holder part 424B is formed on the other end face of the coil holder 429. The core holder parts 424A and 424B have an approximately square pillar shape which narrows toward the rotor element 110. The width of the core holder 424 in the rotation direction decreases toward the rotor element 110. The sectional shape of the core holder 424 in a plane perpendicular to a rotation axis z is an approximate fan shape or trapezoidal shape. In the example shown in FIG. 18, the number of stator cores 123 is 24, and the number of core holders 424 is 12. The core holders 424 are arranged at a circumferential pitch of 30 degrees. The number of core holders 424 changes in accordance with the number of stator cores 123.

As shown in FIG. 16, the core holder 424 is placed between two adjacent stator cores 123. The core holder parts 424A and 424B respectively come in contact with magnetic pole parts 123A and 123B of the stator core 123. The plurality of core holders 424 and the plurality of wedge members 125 are alternately arranged between the stator cores 123, and the plurality of stator cores 123, the plurality of core holders 424, and the plurality of wedge members 125 form an integrated annular body as a whole.

A casing for housing the armature 420 can be the casing 121 according to the first embodiment. The armature 420 can be fixed to the casing 121 by the same method as explained in the first embodiment, specifically, by bolt fastening. Furthermore, the wedge member 125 is pressed toward the rotor element 110 by the same method as explained in the first embodiment, specifically, by using a screw. Consequently, preloads containing rotation-direction components and opposite to each other are applied to two stator cores 123 in contact with the wedge member 125.

In the electric rotating machine according to this embodiment as described above, the armature coil 122 is wound around the coil holder 429 integrated with the core holder 424. Accordingly, heat generated by a copper loss of the armature coil 122 caused when an electric current is supplied is transferred from the coil holder 429 to the core holder 424 by heat conduction, and extracted from the core holder 424. As a consequence, it is possible to more effectively remove heat generated by a copper loss. In addition, the rigidity for supporting the stator core 123 can be improved as in the first embodiment.

Fifth Embodiment

In the fifth embodiment, an explanation of the same parts as in the first embodiment will be omitted as needed, and the explanations will focus on those parts different from the first.

Figure 19:
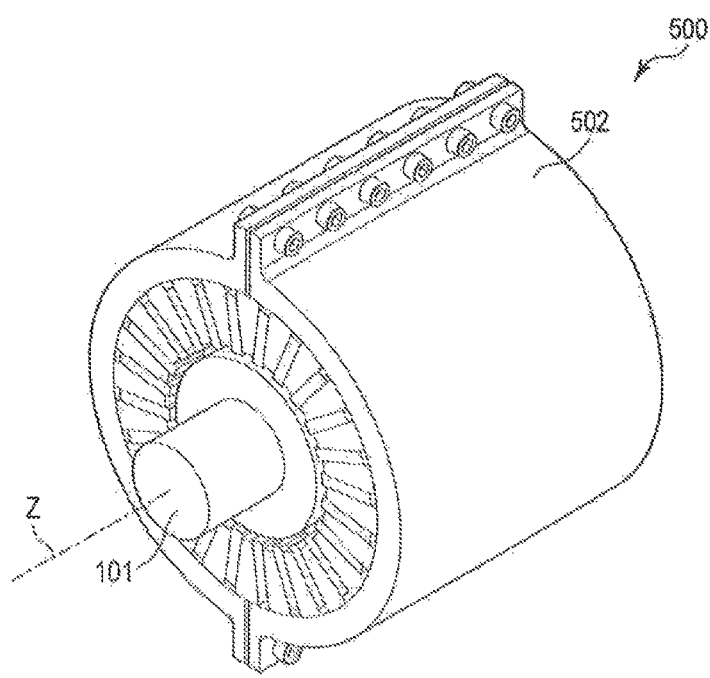
FIG. 19 is a perspective view showing an electric rotating machine according to the fifth embodiment.

FIG. 19 schematically shows an electric rotating machine 500 according to the fifth embodiment. As shown in FIG. 19, the electric rotating machine 500 includes a rotor 101 supported by a bearing (not shown) so as to be rotatable around a rotation axis z, and a stator 502 which opposes the outer circumferential surface of the rotor 101 with a predetermined gap between them. The stator 502 has an approximately cylindrical shape coaxial with the rotation axis z. The rotor 101 is positioned inside the stator 502.

FIGS. 20A and 20B are respectively a perspective view and front view schematically showing the stator 502, and FIG. 21 is a partially exploded view schematically showing the stator 502. The electric rotating machine 500 is a three-stage (three-phase) electric rotating machine in which three basic units are arranged in the rotation-axis direction. As shown in FIG. 21, each basic unit includes one rotational element (not shown), and one armature 520 opposing the rotational element. Note that the number of basic units is determined in accordance with the design conditions, and can be an arbitrary integer that is two or more.

The armature 520 includes an armature coil 122, a plurality of stator cores 123, and a plurality of wedge members 125. The plurality of stator cores 123 and the plurality of wedge members 125 are alternately arranged, and form an integrated annular body as a whole. Specifically, as shown in FIG. 20B, the plurality of stator cores 123 and the plurality of wedge members 125 are arranged in the order of a stator core 123-1, wedge member 125-1, stator core 123-2, wedge member 125-2, stator core 123-3, and so on. In the example shown in FIG. 20B, the number of stator cores 123 is 24, and the number of wedge members 125 is 24. In this case, the stator cores 123 are arranged at a circumferential pitch of 15 degrees, and the wedge members 125 are arranged at a circumferential pitch of 15 degrees.

Note that the explanation has been made by taking the case in which the number of stator cores 123 included in each armature 520 is 24 as an example. However, the number of stator cores 123 is not limited to that of this example, and an optimum number can be selected in accordance with the designed specifications of an application device. The number of wedge members 125 changes in accordance with the number of stator cores 123.

As shown in FIG. 20A, the stator 502 further includes an approximately annular or cylindrical casing 521 having a half-split structure. The material of the casing 521 can be any material which satisfies the mechanical strength required of the electric rotating machine 500. The casing 521 includes casing parts 521A and 521B. The casing parts 521A and 521B are arranged so as to cover the armature 520 around the rotation axis z, and fastened by bolts 530 and nuts 531. Specifically, as shown in FIG. 21, a plurality of through holes 526 are formed in the upper and lower end parts of the casing part 521A and in the upper and lower end parts of the casing part 521B, and the bolts 530 are inserted through the through holes 526 in the casing parts 521A and 521B, and threadably engaged with the nuts 531. In this state, the inner circumferential surfaces of the casing parts 521A and 521B come in contact with an outer circumferential surface 125D of the wedge member 125, so the casing parts 521A and 521B apply a preload containing a rotation-direction component pointing to the rotation axis to the wedge member 125. Consequently, preloads containing rotation-direction components are applied to two stator cores 123 in contact with the wedge member 125. The two stator cores 123 receive preloads in opposite directions.

In the electric rotating machine 500 according to this embodiment, the plurality of stator cores 123 and the plurality of wedge members 125 come in contact with each other and form an integrated annular body as a whole, and the casing 521 applies a preload containing a radial-direction component pointing to the rotation axis z to the wedge member 125. This structure improves the rigidity for supporting the stator core 123. As a result, it is possible to reduce vibrations generated when the electric rotating machine 500 is driven. Since the generation of vibrations is reduced, the generation of noise caused by the vibrations can be reduced as well, so it is possible to prevent a decrease in strength caused by the vibrations. Furthermore, this embodiment can be practiced without any core holders, so the types of components can be reduced. This makes it possible to simplify the structure, improve the ease of assembly, and reduce the cost.

At least one of the above-described embodiments can improve the rigidity for supporting the stator cores by forming the wedge member between the stator cores. In the following sixth to eighth embodiments, application examples of the electric rotating machines according to the above-described embodiments will be explained.

Sixth Embodiment

Figure 22:
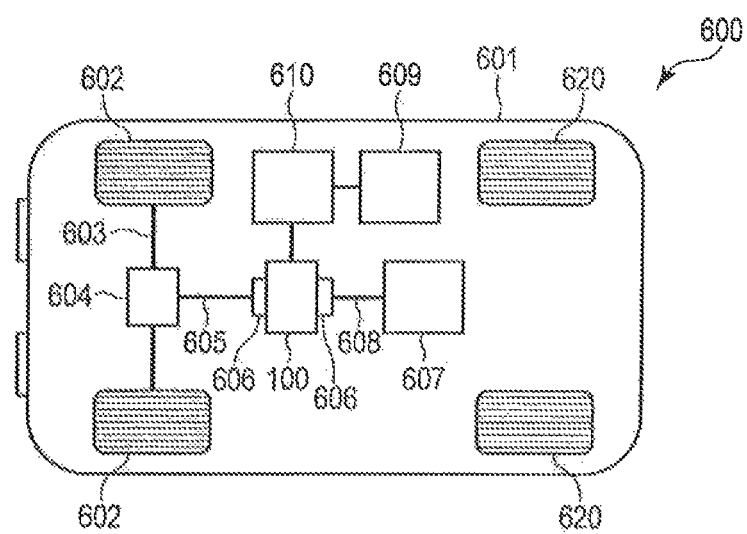
FIG. 22 is a view showing an electrically driven vehicle according to the sixth embodiment.

FIG. 22 schematically shows an electrically driven vehicle 600 according to the sixth embodiment. The electrically driven vehicle 600 includes one of the electric rotating machines described in the first to fifth embodiments, or a modification thereof. In this example shown in FIG. 22, the electrically driven vehicle 600 includes the electric rotating machine 100 according to the first embodiment. The electrically driven vehicle 600 is a so-called hybrid electric vehicle (HEV). A body 601 of the electrically driven vehicle 600 is supported by two front wheels 602 and two rear wheels 620. The front wheels 602 are connected to the electric rotating machine 100 by driving shafts 603, a differential gear 604, and a driving shaft 605. The driving shaft 605 is connected to the rotor 101 (not shown in FIG. 22) of the electric rotating machine 100. The rotor 101 is rotatably supported by bearings 606 arranged on the two sides of the electric rotating machine 100. The electrically driven vehicle 600 further includes an engine 607, and the engine 607 is connected to the rotor 101 by a connecting shaft 608. Accordingly, both the torque of the engine 607 and the torque of the electric rotating machine 100 are transmitted to the front wheels 602, and function as a force of driving the body 601.

Figure 23:
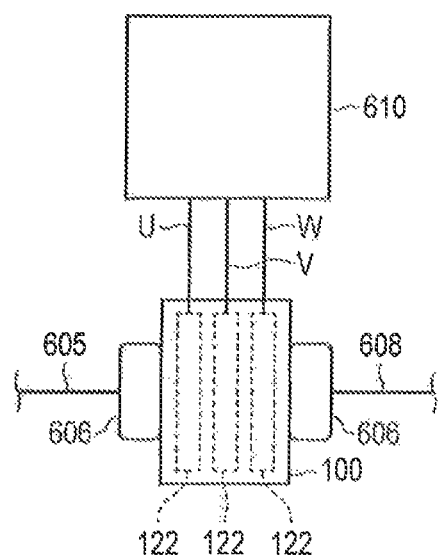
FIG. 23 is a partially enlarged view of the electrically driven vehicle shown in FIG. 22.

FIG. 23 shows details of a part of the electrically driven vehicle 600 including the electric rotating machine 100 in an enlarged scale. As shown in FIG. 23, the power lines of outputs u, v, and w of a controller 610 that operates by using a battery 609 as a power supply are connected to the armature coil 122 of the electric rotating machine 100. The controller 610 applies three-phase electric currents having phase differences of 120° to the armature coil 122 of the electric rotating machine 100. The controller 610 operates so that the electric rotating machine 100 functions as a generator when collecting regenerative energy obtained when the body 601 changes from a running state to a stopped state.

In the electrically driven vehicle 600 using the electric rotating machine 100, vibrations and noise generated when the electric rotating machine 100 operates as a motor and generator are reduced, so the energy conversion efficiency can be improved. In addition, the fuel consumption of the engine 607 can be reduced by using the small-sized, high-output electric rotating machine 100. Consequently, the mileage efficiency can be improved.

The electrically driven vehicle is not limited to the hybrid electric vehicle as shown in FIG. 22, and may also be an electric vehicle (EV). The mileage efficiency can be improved even when the electric rotating machine according to an embodiment (for example, the electric rotating machine 100) is applied to the electric vehicle.

Seventh Embodiment

FIG. 24 schematically shows a wind turbine generator 700 according to the seventh embodiment. The wind turbine generator 700 includes one of the electric rotating machines described in the first to fifth embodiments, or a modification thereof. In this example shown in FIG. 24, the wind turbine generator 700 includes the electric rotating machine 100 according to the first embodiment. Blades 701 of the wind turbine generator 700 rotate by wind power, and transmit the torque to a speed increaser 703 via a rotating shaft 702. The output torque from the speed increaser 703 is transmitted to the rotor 101 (not shown in FIG. 24) of the electric rotating machine 100 via a rotating shaft 704 and shaft coupling 705, and the electric rotating machine 100 generates electric power. The generated electric power is supplied to a power system 708 via a transformer 706 and system protector 707.

Rotary system main parts including the speed increaser 703 and electric rotating machine 100 are housed in a machine room called a nacelle 709. The nacelle 709 is supported by a tower 710 so that the blades 701 are positioned at a height at which wind power can efficiently be obtained. The tower 710 is fixed on a base 711 installed on the ground or on a floating body on the sea.

In the wind turbine generator 700 using the electric rotating machine 100, vibrations and noise generated when the electric rotating machine 100 operates can be reduced. This makes it possible to reduce energy that is lost as vibrations and noise, and to efficiently convert wind power into power generation energy. In addition, the use of the small-sized, high-output electric rotating machine 100 makes it possible to reduce the size and weight of the nacelle 709, and relax the design conditions of the mechanical strength required of the tower 710. As a result, it is possible to reduce the construction cost and construction period of the tower 710, and reduce the overall cost of the wind turbine generator 700. When the wind turbine generator 700 is a floating offshore wind turbine generator in which the base 711 is installed on a floating body on the sea, it is possible to reduce the ocean transport cost of the nacelle 709, and reduce the floating body construction cost and construction period of the base 711, thereby reducing the overall cost of the wind turbine generator 700.

Note that the electric rotating machines according to the embodiments can be used not only for the wind turbine generator, but also for general power generators such as a hydroelectric generator. Even when applying the electric rotating machines according to the embodiments to a power generator other than the wind turbine generator, it in possible to suppress a power generation loss caused by vibrations and noise, and to improve the power generation efficiency.

Eighth Embodiment

FIG. 25 schematically shows a rope elevator device 800 according to the eighth embodiment. The elevator device 800 includes one of the electric rotating machines described in the first to fifth embodiments, or a modification thereof. In this example shown in FIG. 25, the elevator device 800 includes the electric rotating machine 300 according to the third embodiment.

The elevator device 800 includes a winding machine 801, cage 802, counterweight 803, and rope 804, and is installed in a hoistway 807. The winding machine 801 includes the electric rotating machine 300 and a sheave. The rope 804 is wound around a pulley 805 of the cage 802, the winding machine 801, and a pulley 806 of the counterweight 803. One end of the rope 804 is fixed to a predetermined position A of a building or the like, and the other end of the rope 804 is fixed to a predetermined position B of the building or the like. When a controller (not shown) drives the winding machine 801, a torque generated by the electric rotating machine 300 rotates the sheave. The winding machine 801 can move the cage 802 upward or downward by winding up or down the rope 804 by using the frictional force between the sheave and rope 804.

In the elevator device 800 using the electric rotating machine 300, vibrations and noise generated when the electric rotating machine 300 operates can be reduced, so the energy conversion efficiency can be improved. Also, when the vibrations of the electric rotating machine 300 as a torque generation source of the winding machine 801 are reduced, vibrations transmitted to the cage 802 via the rope 804 are also reduced. The ride comfort of the elevator device 800 can be improved. Furthermore, it is possible to reduce vibrations and noise transmitted outside the hoistway 807.

Note that in the sixth to eighth embodiments, examples in which the electric rotating machines according to the embodiments are applied to an electrically driven vehicle, power generator, and elevator device have been explained. However, the electric rotating machines according to the embodiments are also applicable to devices other than the electrically driven vehicle, power generator, and elevator device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric rotating machine comprising:
   a rotor element rotatable around a rotation axis;
   an annular coil provided to be coaxial with the rotation axis;
   a plurality of stator cores provided opposite to the rotor element, the plurality of stator cores each including a pair of magnetic pole parts opposing each other with the coil being interposed therebetween;
   a plurality of wedge members made of a nonmagnetic material, each of the plurality of wedge members being arranged between adjacent stator cores to apply preloads to the adjacent stator cores, the preloads containing components in a rotation direction of the rotor element and being opposite to each other; and a pressing member which presses the plurality of wedge members toward the rotor element.

2. The machine according to claim 1, wherein the plurality of stator cores and the plurality of wedge members are alternately arranged to form an integrated annular body.

3. The machine according to claim 1, further comprising a plurality of first support members, each of the plurality of first support members being arranged between the adjacent stator cores, the adjacent stator cores being fixed to the first support member in a contact state, wherein a plurality of sets of the first support members and the wedge members and the plurality of stator cores are alternately arranged so that the plurality of stator cores, the plurality of first support members, and the plurality of wedge members form an integrated annular body.

4. The machine according to claim 3, further comprising a second support member, the plurality of first support members being fixed to the second support member in a contact state, the second support member being integrated with at least one of the plurality of first support members.

5. The machine according to claim 1, further comprising a plurality of first support members, each of the plurality of first support members arranged between adjacent stator cores, the adjacent stator cores being fixed to the first support member in a contact state, wherein the plurality of first support members and the plurality of wedge members are arranged between the plurality of stator cores so that the plurality of stator cores, the plurality of first support members, and the plurality of wedge members form an integrated annular body.

6. The machine according to claim 5, further comprising a second support member provided to cover the plurality of stator cores, the plurality of first support members being fixed to the second support member in a contact state.

7. The machine according to claim 6, wherein the plurality of first support members are fixed to the second support member in a contact state by using screws.

8. The machine according to claim 5, further comprising a second support member provided to cover the plurality of stator cores, the plurality of first support members being fixed to the second support member in a contact state, the second support member being integrated with at least one of the plurality of first support members.

9. The machine according to claim 4, further comprising a third support member, the coil being fixed to the third support member in a contact state, the third support member being integrated with at least one of the plurality of first support members.

10. The machine according to claim 4, wherein the pressing member comprises a plurality of screws threadably engaged with a plurality of screw holes formed in the second support member, the plurality of screws applying, to the plurality of wedge members, a preload containing a radial-direction component pointing to the rotation axis by coming into contact with the plurality of wedge members.

11. The machine according to claim 1, wherein the plurality of wedge members are fixed to the plurality of stator cores in a contact state by adhesion.

* * * * *